UNITED STATES PATENT OFFICE.

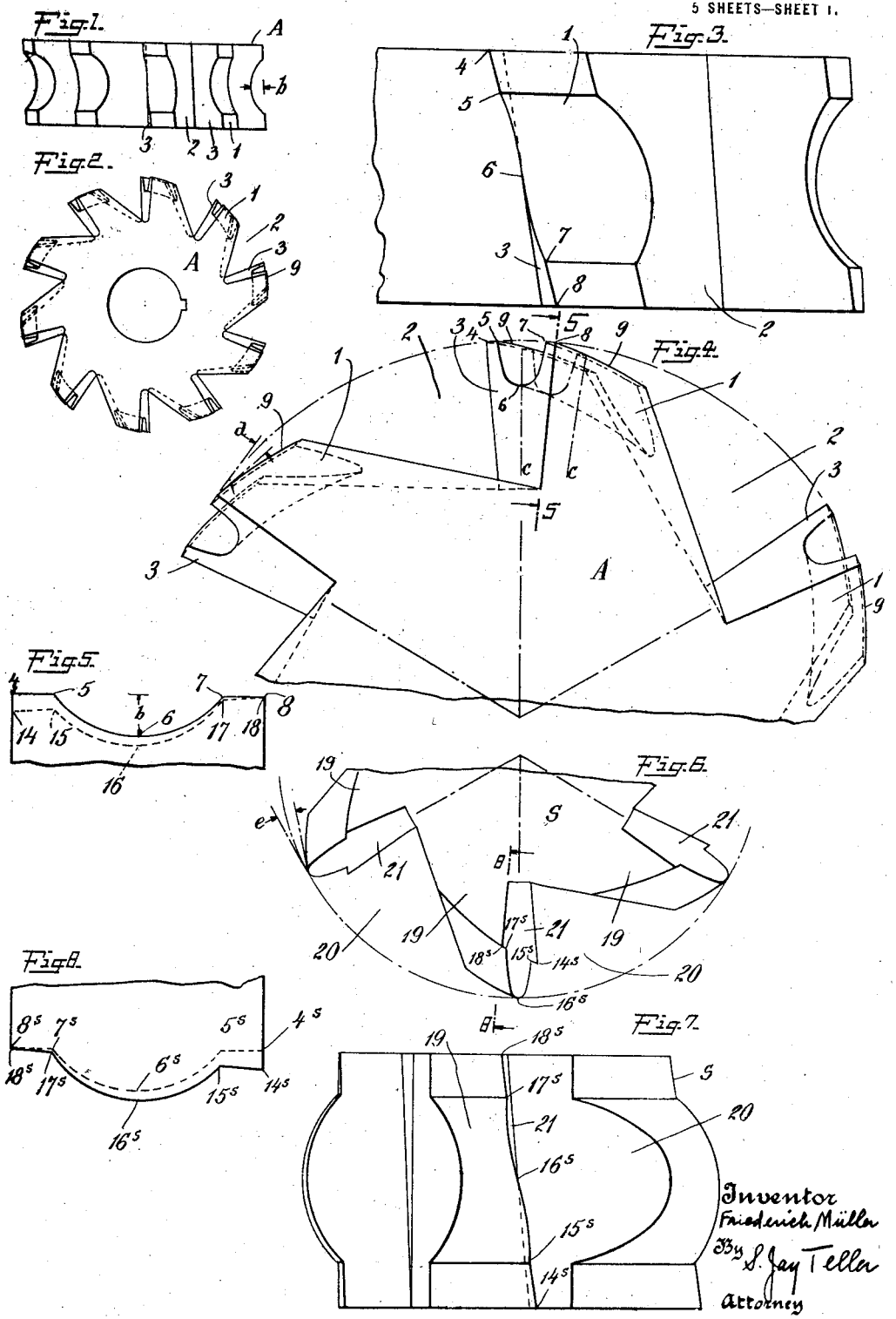

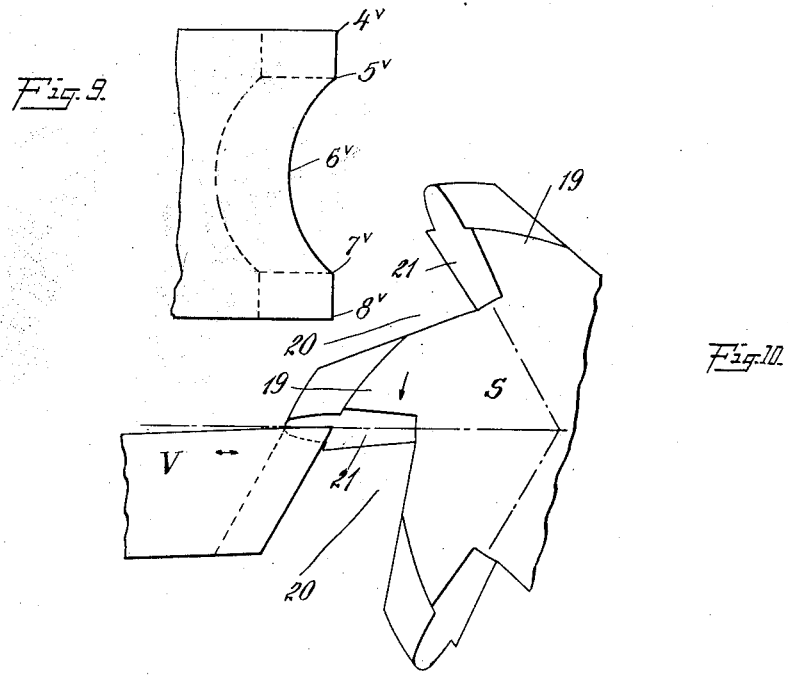
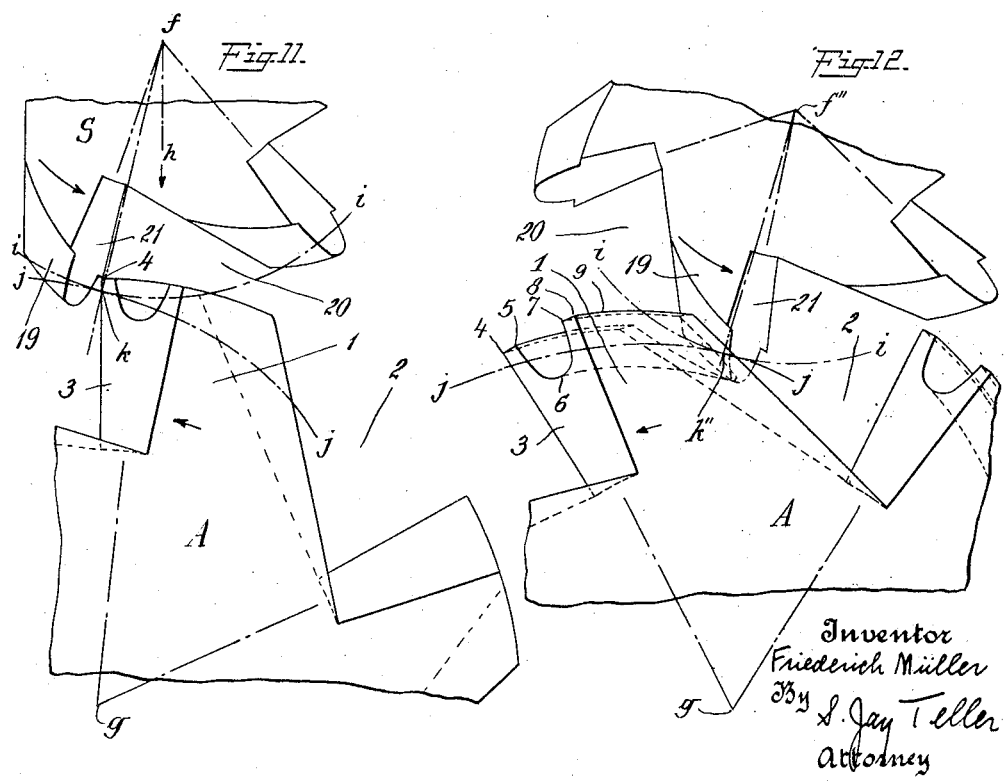

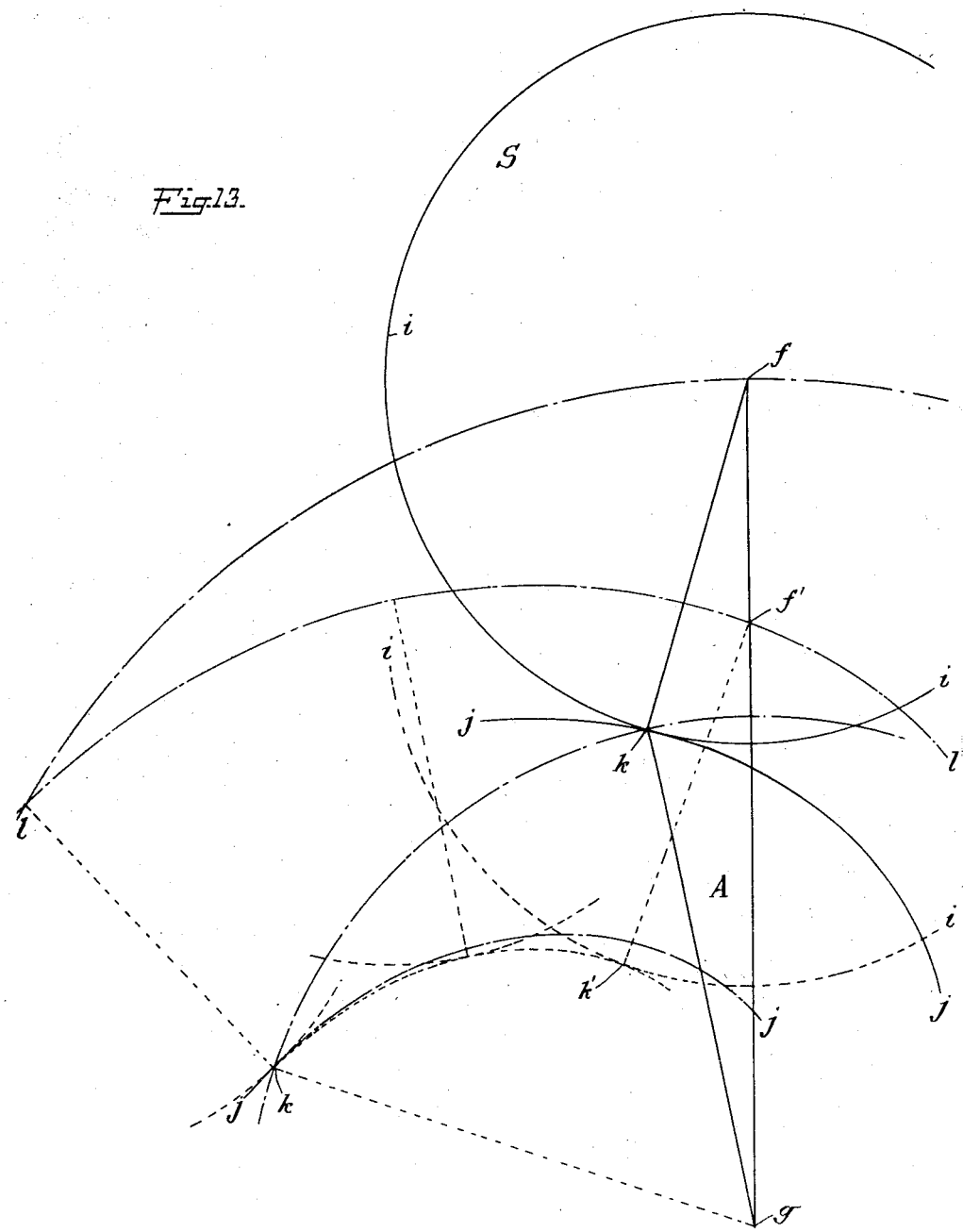

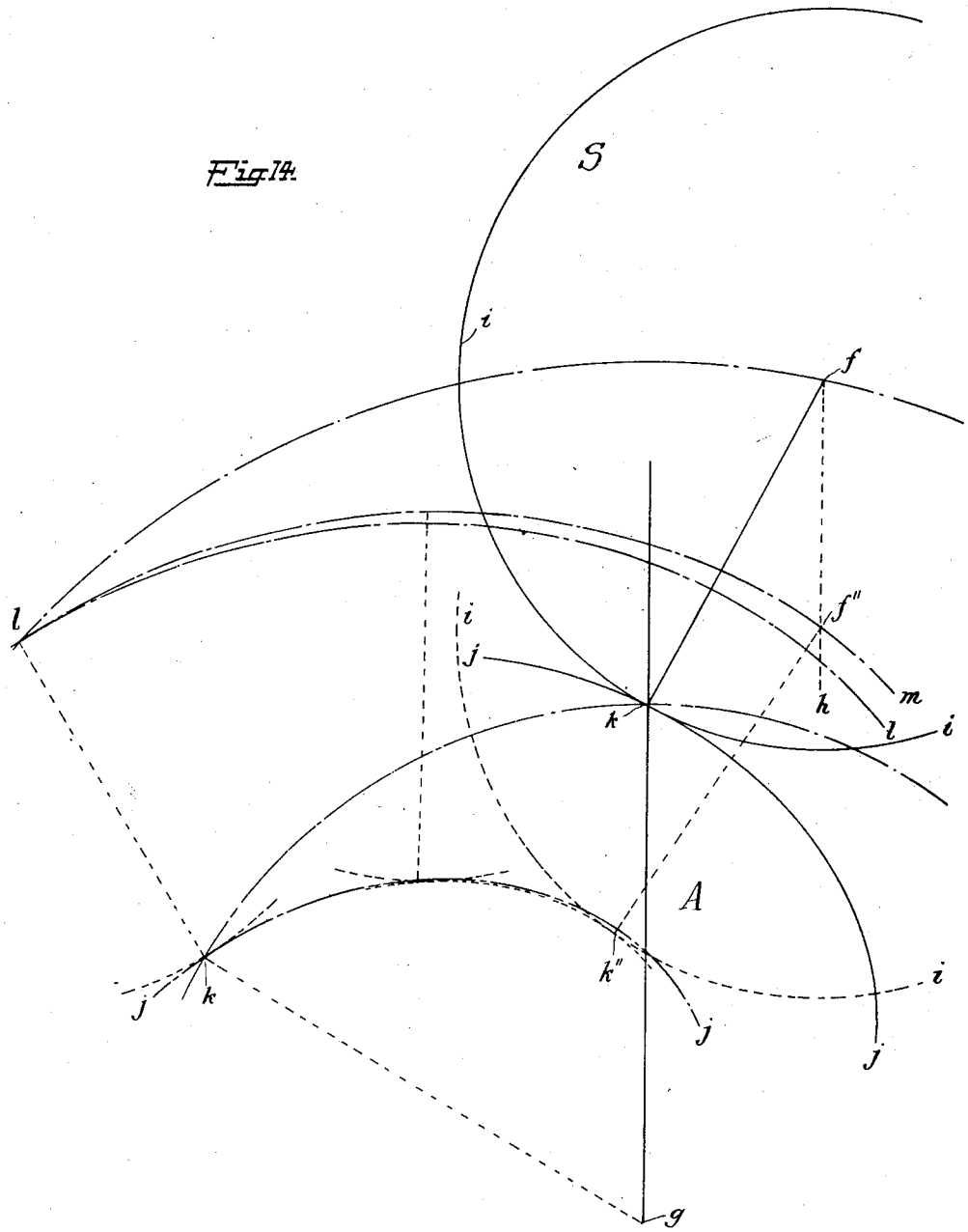

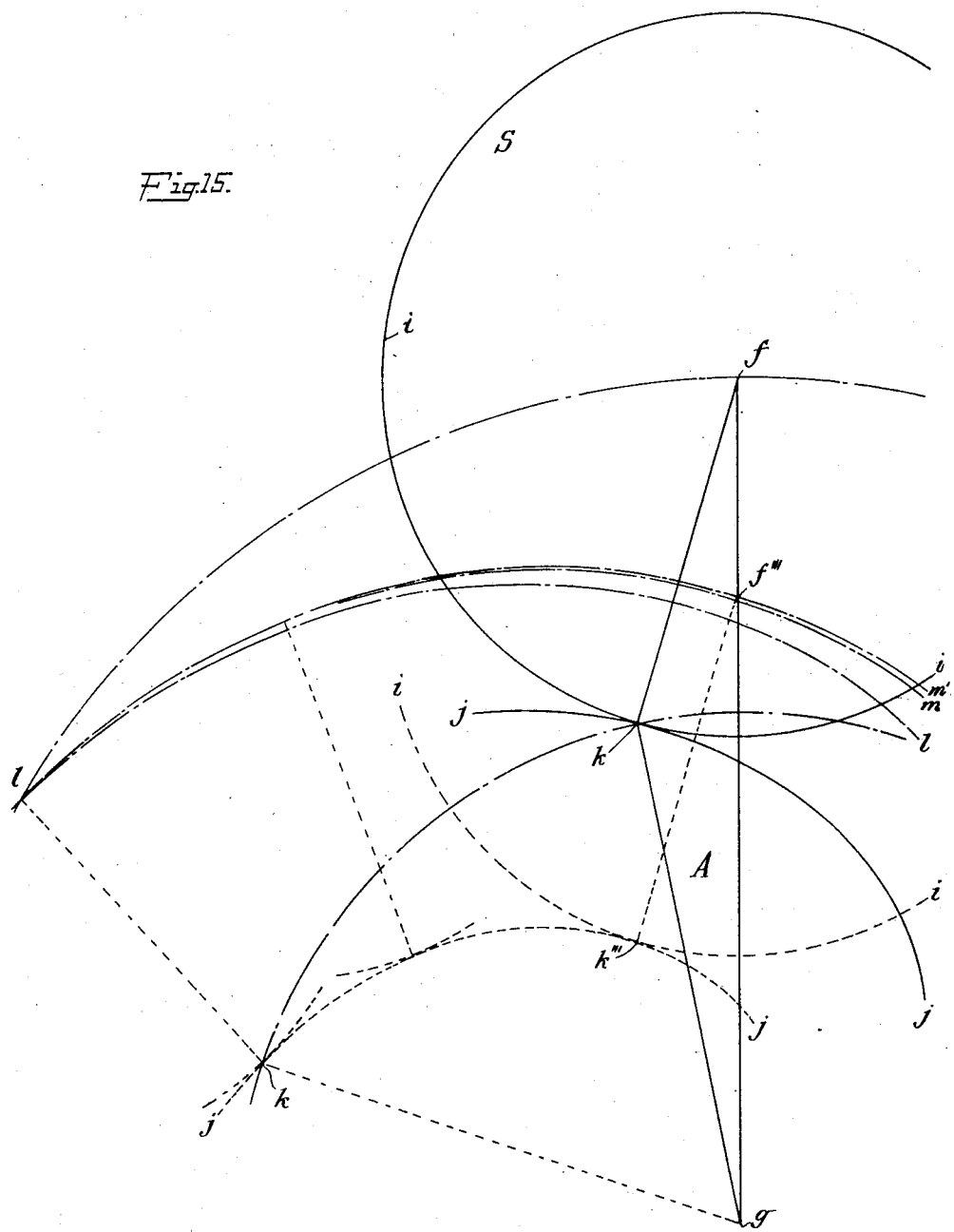

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING-CUTTERS.

1,348,300.     Specification of Letters Patent.     Patented Aug. 3, 1920.

Application filed December 26, 1918, Serial No. 268,354. Renewed April 6, 1920. Serial No. 371,739.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling-Cutters, of which the following is a specification.

The present invention relates to a method involving the use of a rotating cutter for milling the spiral relief upon the milling cutter which is being made. The object of the present invention is to provide for the avoidance of a very small error which arises when relieved milling cutters are milled in the usual way.

The invention is particularly adapted for use in conjunction with or as a part of the method set forth in my copending application for methods of making milling cutters, Serial No. 268,350, filed on even date herewith. While the present invention is not so limited, I will, in order to present the preferred form thereof, illustrate it in conjunction with the method set forth in my said application. In order that the method may be clearly understood, I have shown in the accompanying drawings a formed or contour milling cutter having teeth with inclined or helicoidal front cutting faces, as presented and claimed in my copending application for milling cutters, Serial No. 268,349, filed on even date herewith. It will be understood, however, that the drawings are for illustrative purposes only and are not to be construed as defining or limiting the scope of the invention, the accompanying claims being relied upon for that purpose.

Of the drawings:

Figures 1 and 2 are plan and end views respectively of a formed milling cutter such as may be made in accordance with the invention.

Figs. 3 and 4 are enlarged fragmentary diagrammatic plan and end views respectively of the milling cutter shown in Figs. 1 and 2. In these views there is shown a smaller number of teeth and the inclination of the cutting faces and the relief are increased in order to bring out the principles of the invention more clearly.

Fig. 5 is a diagrammatic view illustrating certain features of the cutter shown in Figs. 3 and 4.

Figs. 6 and 7 are enlarged diagrammatic end and bottom views respectively of a preliminary milling cutter adapted to be used for milling the final cutter shown in Figs. 3 and 4. The cutter is shown as having a smaller number of teeth and as having increased inclination and relief in conformity with the increased inclination and relief shown in Figs. 3 and 4.

Fig. 8 is a diagrammatic view illustrating certain features of the preliminary cutter shown in Figs. 6 and 7.

Fig. 9 is a plan view of a lathe tool adapted to be used for the shaping of the preliminary milling cutter.

Fig. 10 is a diagrammatic view illustrating a method of shaping the preliminary milling cutter, use being made of the tool shown in Fig. 9.

Fig. 11 is an enlarged diagrammatic side view illustrating the preliminary cutter in use for milling the final cutter, the milling operation having been started but not finished.

Fig. 12 is a view similar to Fig. 11 but showing the milling operation completed.

Figs. 13 and 14 are diagrammatic views illustrating the principle of the method step shown in Figs. 11 and 12.

Fig. 15 is a diagrammatic view similar to Figs. 13 and 14, but showing a variation of the method.

In order that the method may be clearly understood I will first describe a cutter such as can be made in accordance with the invention. Referring particularly to Figs. 1 to 5 of the drawings, it will be seen that I have shown a cutter A which is shaped to cut a predetermined contour differing from a straight line. The cutter is provided with a plurality of generally longitudinal teeth 1 between which are grooves 2, the teeth and grooves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face is radial or approximately so in order to provide a satisfactory cutting angle. Each cutting face 3 is inclined or positioned obliquely so that its longitudinal lines lie at angles to the axis of the cutter. Preferably, each tooth 1 is generally helical in form and each cutting face 3 conforms to a helicoid. As illustrated, the helicoid is one formed by a generatrix following the axis of the cutter and also following a helix on a cylinder concentric with the axis thereof. The teeth and the cutting faces may be inclined in either direction and the degree of inclination may be varied as required.

The cutter may be made for cutting any desired practical predetermined contour, and the outer edge of each cutting face 3 has an outline which is adapted to cut the predetermined contour when the cutter is rotated, this outline of the cutting face following the helicoidal surface thereof. This will be more clearly understood from the diagrammatic views in Figs. 3 and 4. For the particular contour illustrated, the four points 4, 5, 7 and 8 on the outline of the cutting face are all at equal distances from the axis of the cutter; the central point 6 is at a distance from the axis which is less by the distance $b$; and all other points along the outline are at their respective correct distances from the center so that when the cutter is rotated they will define the correct predetermined contour, as shown by full lines in Fig. 5. This relationship of the several points along the outline of the cutting face obtains notwithstanding the fact that the cutting face is a warped or helicoidal surface.

Each tooth of the cutter is relieved along lines 9 extending backward and inward from the outline of the cutting face, these relief lines forming a continuous surface or continuous surfaces which extend from end to end of the cutter. The relief lines are properly constructed notwithstanding the variations in radius at different points along the said outline and notwithstanding the variations in angular position resulting from the warped or helicoidal cutting face. The relief lines 9 are maintained in similar relationship to each other as they extend backward and inward, the lines conforming to spirals of Archimedes. The result is that each tooth of the cutter, at any axial plane of intersection, such as 5—5, has a distorted shape, as shown by dotted lines in Fig. 5. This distorted shape includes points 14, 15, 16, 17 and 18 corresponding respectively to the points 4, 5, 6, 7 and 8 on the outline of the cutting face. The distortion of shape results from the fact that the successive inward inclined relief lines 9 start at different angular positions because of the inclined or helicoidal cutting face. Therefore with the cutting face inclined in the direction illustrated the several points 17, 16, 15 and 14 to the left of the point 8 or 18 are spaced inward from the respective points 7, 6, 5 and 4 by progressively increasing distances. Notwithstanding this distortion in shape at an axial plane of intersection, the outline or effective contour at the cutting face is correct, as before stated.

It is possible to sharpen or grind the teeth of the cutter on the front cutting faces 3 without changing the effective contour. The teeth present the same effective contour at successive inclined surfaces of intersection similar in form and position to the initial cutting faces 3. At any surface, such as $c$—$c$, back of an initial cutting face 3 and similar to the said face, the same effective contour will be found. Therefore if the teeth are ground on their front faces to helicoids which are the same as the helicoids of the initial cutting faces the effective contour will remain the same.

Taking up now the method of making the milling cutter, it will be understood that the preliminary steps of turning the blank, cutting the grooves therein, etc., can be carried on in any usual or preferred way, these not of themselves constituting any part of the present invention. The invention relates particularly to the method of shaping the blank to provide a distorted shape which will enable it to cut a correct contour.

In accordance with the general method set forth in my aforesaid copending application, Serial No. 268,350, the shape of the cutter to be made is formed by means of a preliminary milling cutter. I will herein confine myself to a brief description of one form of preliminary milling cutter, reference being had to the said application for descriptions of possible variations thereof.

The preliminary milling cutter is represented by S and is shown diagrammatically in Figs. 6 to 8. The cutter S is provided with generally longitudinal teeth 19 which are separated by grooves 20 and which have front cutting faces 21. Each tooth of the preliminary cutter S has at any axial plane of intersection such as 8—8 a shape which is the same or approximately the same as the predetermined contour of the cutter A, as shown by dotted lines in Fig. 8. While the contour is the same it is reversely positioned with respect to the axis, the points which are outermost on the final cutter being innermost on the preliminary cutter and vice versa. The points along this plane of intersection are indicated by $4^s$, $5^s$, $6^s$, $7^s$ and $8^s$, these corresponding respectively to the points 4, 5, 6, 7 and 8 on the effective contour of the final cutter A.

The front cutting faces 21 of the teeth 19 of the cutter S are helicoidal in form and have the same longitudinal pitch or lead as the helicoidal faces 3 of the teeth 1 of the cutter A. The cutting faces of the teeth of both cutters are inclined in the same direction. The preliminary cutter S is shown as being somewhat smaller than the cutter A, this being preferable in order to enable the preliminary cutter to clear one tooth of the final cutter while milling another tooth. When the cutter S is smaller, as shown, there is an apparent difference in the helicoidal surfaces of the two cutters. While the helicoids are in reality the same, being determined by the same or similar directrices, the actual angle of inclination is less for the preliminary cutter S than for the final cutter A because of the smaller diameter.

Each tooth 19 of the preliminary cutter S has a degree of relief which is the same as the degree of relief of the teeth of the final cutter. The "degree of relief" in each case is represented by the ratio between the angular advance of the cutter and the corresponding decrease in radius. The decrease in radius for each angular increment of advance of the cutter S is the same as the decrease in radius for each angular increment of advance for the cutter A. While the degrees of relief are the same for both cutters, there is an apparent difference because of the smaller diameter of the cutter S. The relief lines meet the circumferential lines at a relatively small angle such as $d$ for the cutter A, and at a relatively large angle such as $e$ for the cutter S, but it will be remembered that the degrees of relief are the same, as before explained.

As the result of providing the preliminary cutter S with the same helicoidal cutting faces and with the same degree of relief as the final cutter A, the front outline or effective contour of each tooth is distorted, as shown by full lines in Fig. 8, the points $14^s$, $15^s$, $16^s$ $17^s$ and $18^s$ along the distorted outline corresponding respectively to the points $4^s$, $5^s$, $6^s$ $7^s$ and $8^s$ along the shape at an axial plane of intersection. The several points $17^s$, $16^s$ $15^s$ and $14^s$ to the right of the points $8^s$ or $18^s$ are spaced outward from the respective points $7^s$, $6^s$, $5^s$ and $4^s$ by progressively increasing distances. The actual inclination of each cutting face is less than that of the faces of the cutter A by reason of the smaller diameter, but the amount of relief is more for the same reason, and these differences exactly compensate for each other. The result is that the distortion of the outlines $14^s$, $15^s$ $16^s$ $17^s$ and $18^s$ of the teeth of the cutter S is exactly the reverse of the desired distortion 14, 15, 16, 17 and 18 of the teeth of the final cutter A along axial planes of intersection, the two distortions being exactly the same in extent.

The preliminary cutter S can most conveniently be made by means of a lathe tool such as V shown in Figs. 9 and 10, this tool being used in a relieving lathe. The lathe tool V is formed with its top cutting face having a contour $4^v$, $5^v$ $6^v$, $7^v$, $8^v$, which is the same as the effective contour 4, 5, 6, 7, 8 of the teeth of the final cutter A. In order to make a small correction, as explained in detail in my aforesaid application, Serial No. Case $C^a$, the tool V is preferably set with its top cutting face in a plane at an angle to a plane through the axis of the preliminary cutter S, as indicated in Fig. 9. When the preliminary cutter S is being formed it is rotated in the direction of the arrow, the tool V being moved in and out, as indicated by the horizontal arrow, so as to follow the proper relief lines.

Figs. 11 and 12 show the preliminary cutter S in use for milling the final cutter A. It will be understood that the cutter S is rapidly rotating in the direction indicated by the arrow thereon; that the blank A is slowly rotating in the direction indicated by the arrow thereon; and that relative approaching and receding movements are effected between the cutter and the blank in timed relation to the blank rotation to provide the required relief on the final cutter. These relieving movements are preferably effected by moving the axis of the cutter bodily downward, as indicated by the vertical arrow, and then bodily upward in the opposite direction. Preferably the downward relieving movement is at a regular rate definitely proportioned to the rate of turning of the blank A. The cutter S is moved slowly downward during the cutting of each tooth and then is rapidly moved upward between the teeth to position it for the cutting of the next tooth.

As shown in Fig. 11, the cutter S and the blank A have been so adjusted that the teeth 19 of the rotating cutter S will mill the initial point 4 of the tooth 1 of the blank A to the required distance from the axis. The downward movement of the cutter S in timed relation to the slow rotation of the blank A causes it to take a cut which gradually increases in depth at the successive points 5, 6, 7 and 8 back of the point 4. This action is continued till the relative position shown in Fig. 12 is reached. In this milling action the distorted shape of the cutter S causes the desired distortion in the shape of the cutter A. The cutter S shapes the cutter A with the several points 4, 5, 6, 7 and 8 all at the proper distances from the axis, so that the cutter A when used will generate the true predetermined contour, as shown by full lines in Fig. 3.

It will be noted that the preliminary cutter S is fed in such a way that its center $f$ does not move radially inward directly toward the center $g$ of the final cutter A but along a line $f$—$h$ such as indicated by the arrow in Fig. 11. The mean circle $i$—$i$ of the contour of the preliminary cutter S is tangent to the mean relief line $j$—$j$ of the final cutter A at the point $k$, and the direction of feeding is such that this point of tangency *k* is moved radially inward, or approximately so. The result is that the relief lines of the final cutter follow spirals of Archimedes, as is desired.

The theory of the method hereinbefore set forth whereby the final cutter is milled with a correct effective contour at the helical cutting faces, is based upon the assumption that the preliminary cutter and the final cutter are provided with the same, or at least with related, degrees of spiral relief. Any variation from the predetermined spiral relief of the final cutter will interfere with the method and cause an error in the contour. For accurate spiral relief, the radius decreases uniformly in direct proportion to the angle of turning. To cut such a relief on the final cutter it is necessary for the cutting point to be uniformly moved radially inward in direct proportion to the turning of the final cutter and at the same rate as the corresponding decrease in radius of the spiral. The cutting point, however, is at *k* and the preliminary cutter S is therefore moved, as before stated, along the line *f—h* so that the cutting point *k* will move approximately radially inward.

The principle of the method step illustrated in Figs. 11 and 12 will be more clearly understood by referring to Figs. 13 and 14. In Fig. 13 I have shown diagrammatically the cutter S positioned with its center *f* in line with the center *g* of the blank A. The cutter is fed radially toward the center *g* at a rate which exactly corresponds to the decrease in radius of the required mean spiral relief line *j—j*. The mean circle *i—i* of the cutter S is tangent to the line *j—j* at *k*.

The dotted lines in Fig. 13 show a position which is reached by the blank A and the cutter S. Inasmuch as the center *f* is moved toward the center *g* at a rate definitely proportioned to the rate of turning of the blank A, it will be seen that the center would trace a spiral line *l—l* on an imaginary surface rotating with the blank A. The center of the cutter has moved inward to a point *f'* located on the line *l—l*, and the point of cutting is at *k'*. The cutting point in moving from *k* to *k'* has generated a line *k—k'* which throughout its length is uniformly spaced perpendicularly from the line *l—l*. The true spiral *j—j* extending through the point *k* is uniformly spaced from the line *l—l*, not perpendicularly but, when measured along radial lines through the center *g*. Therefore, the two lines *k—k'* and *j—j* do not coincide and the line *k—k'* is erroneous. It will thus be seen that the moving of the center of the cutter S radially inward at a rate corresponding to the decrease in radius of the spiral relief line *j—j*, will not result in the cutting of said line *j—j* but in the cutting of an erroneous line *k—k'*, which gives too great a relief.

Fig. 14 is similar to Fig. 13 but shows the center *f* located at one side of the line through the center *g* of the cutter A. The center is moved at the same rate as before but instead of being moved directly toward the center *g*, it is moved along a line *f—h* parallel to the line connecting the center *g* with the point of tangency *k*.

The dotted lines in Fig. 14 show a position which is reached by the blank A and the cutter S. The center of the cutter S has moved inward to a point *f''* and that the point of cutting is at *k''*. The cutting point in moving from *k* to *k''* has generated a curve *k—k''*. Inasmuch as the center *f* has moved along a line *f—h* parallel to the line connecting the cutting point *k* with the center *g*, the said point *k* has moved approximately radially. The rate of moving was directly proportioned to the rate of turning of the blank A, and therefore the cutting point has approximately followed a true spiral line *k—k''*. The line *k—k''* does not exactly coincide with the desired spiral line *j—j* because of the changing angle of the spiral as the radius decreases, but the error is so small as to be entirely negligible. It will be seen that the center of the cutter has traced a curve *l—m* on an imaginary plane rotating with the cutter A, this line being outside of the true spiral line *l—l* such as was traced by the center in Fig. 13.

Fig. 15 shows a slightly different way of practising the method. The center *f* of the cutter S is located on the center line as in Fig. 13. The center is moved directly toward the center *g* of the cutter A but at a rate which is slightly less than that corresponding to the decrease in radius of the required spiral. The center is moved at such a rate that it traces a curve *l—m'* which is approximately the same as the curve *l—m* traced by the center when controlled in the way shown in Fig. 14. Preferably however the curve *l—m'* is slightly outside the curve *l—m* as shown so as to correct even the minute error indicated in Fig. 14. The center of the cutter S has moved inward to *f'''* and the cutting point is at *k'''*. The line *k—k'''* exactly coincides with the line *j—j* and the error is entirely corrected.

It will be seen that approximately the same result is obtained by the two differing steps shown in Figs. 14 and 15. In each case the net result is to effect the relative movement of the center of the preliminary cutter toward the center of the final cutter at a rate which is slightly less than the corresponding decrease in radius of the required spiral.

The decrease rate of feeding is just sufficient to cause the cutting of true or very nearly true spiral relief.

What I claim is:

1. The herein described method of milling a milling cutter to form spiral relief thereon, the method consisting in placing a rotating preliminary cutter in operative relation to a blank for the final cutter, in slowly rotating the blank, and in feeding the preliminary cutter in such a way that its center moves inward at a rate related to the rate of rotation of the blank but less than the corresponding decrease in radius of the spiral relief.

2. The herein described method of milling a milling cutter to form spiral relief thereon, the method consisting in placing a rotating preliminary cutter in operative relation to a blank for the final cutter, in slowly rotating the blank, and in feeding the preliminary cutter in such a way that the point of tangency between the mean circle of the cutter and mean relief line of the blank moves inward at the same rate as the corresponding decrease in radius of the spiral relief.

3. The herein described method of milling a milling cutter to form spiral relief thereon, the method consisting in placing a rotating preliminary cutter in operative relation to a blank for the final cutter, in slowly rotating the blank, and in feeding the preliminary cutter in such a way that its center moves inward at the same rate as the corresponding decrease in radius of the spiral relief, the movement being parallel with a line connecting the center of the blank with the point of tangency between the mean circle of the cutter and the mean relief line of the blank.

4. The herein described method of shaping a spirally relieved milling cutter adapted to cut a predetermined contour other than a straight line and having helicoidal cutting faces, the method consisting in forming a preliminary milling cutter having at axial planes of intersection a shape the same or approximately the same as the predetermined contour and having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, in rotating the preliminary cutter in operative relation to a blank for the final cutter, in slowly rotating the blank, and in feeding the preliminary cutter inward at a rate related to the rate of rotation of the blank but less than the corresponding decrease in radius of the spiral relief.

5. The herein described method of shaping a spirally relieved milling cutter adapted to cut a predetermined contour other than a straight line and having helicoidal cutting faces, the method consisting in forming a preliminary milling cutter having at axial planes of intersection a shape the same or approximately the same as the predetermined contour and having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, in rotating the preliminary cutter in operative relation to a blank for the final cutter, in slowly rotating the blank, and in feeding the preliminary cutter in such a way that the point of tangency between the mean circle of the cutter and the mean relief line of the blank moves inward at the same rate as the corresponding decrease in radius of the spiral relief.

6. The herein described method of shaping a spirally relieved milling cutter adapted to cut a predetermined contour other than a straight line and having helicoidal cutting faces, the method consisting in forming a preliminary milling cutter having at axial planes of intersection a shape the same or approximately the same as the predetermined contour and having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, in rotating the preliminary cutter in operative relation to a blank for the final cutter, in slowly rotating the blank, and in feeding the preliminary cutter in such a way that its center moves inward at the same rate as the corresponding decrease in radius of the spiral relief, the movement being parallel with a line connecting the center of the blank with the point of tangency between the mean circle of the cutter and the mean relief line of the blank.

In testimony whereof, I hereto affix my signature.

FRIEDERICH MÜLLER.